(12) United States Patent
Sumida (10) Patent No.: US 9,038,792 B2
(45) Date of Patent: May 26, 2015

(54) SHOCK ABSORBER

(75) Inventor: Masashi Sumida, Kani (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 182 days.

(21) Appl. No.: 13/818,911

(22) PCT Filed: Nov. 29, 2011

(86) PCT No.: PCT/JP2011/077477
§ 371 (c)(1),
(2), (4) Date: Feb. 25, 2013

(87) PCT Pub. No.: WO2012/073930
PCT Pub. Date: Jun. 7, 2012

(65) Prior Publication Data
US 2013/0153348 A1 Jun. 20, 2013

(30) Foreign Application Priority Data
Dec. 2, 2010 (JP) .................................. 2010-269521

(51) Int. Cl.
*F16F 9/18* (2006.01)
*B62K 25/08* (2006.01)
*B62K 25/04* (2006.01)

(52) U.S. Cl.
CPC . *F16F 9/18* (2013.01); *B62K 25/08* (2013.01); *B62K 2025/048* (2013.01)

(58) Field of Classification Search
USPC ......................... 188/313–317, 310; 267/64.26
See application file for complete search history.

(56) References Cited

U.S. PATENT DOCUMENTS

| 7,575,110 B2* | 8/2009 | Yoshimoto ..................... 188/312 |
| 8,251,355 B2* | 8/2012 | Tomiuga et al. ........... 267/64.26 |
| 8,567,575 B2* | 10/2013 | Jung et al. ..................... 188/297 |
| 2004/0226790 A1* | 11/2004 | Yoshimoto .................... 188/315 |

FOREIGN PATENT DOCUMENTS

| JP | 4-312221 A | 11/1992 |
| JP | 8-170681 A | 7/1996 |
| JP | 11-153170 A | 6/1999 |
| JP | 2009-204118 | 9/2009 |
| JP | 2011-214584 A | 10/2011 |

* cited by examiner

*Primary Examiner* — Melanie Torres Williams
(74) *Attorney, Agent, or Firm* — Rabin & Berdo, P.C.

(57) ABSTRACT

A shock absorber includes a shock absorber main body composed of a vehicle-body side tube and a wheel side tube and formed with a lubrication clearance, a damper including a cylinder, a piston which partitions the interior of the cylinder into two working chambers, and a rod, a reservoir chamber composed of an air chamber and a working fluid chamber, a partition wall member for partitioning the working fluid chamber into an upper working fluid chamber and a lower working fluid chamber, a flow path having a check valve for permitting only a movement of the working fluid from the upper working fluid chamber to the lower working fluid chamber, and a communication path for allowing communication between the lower working fluid chamber and the lubrication clearance. A cross-sectional area of the lubrication clearance and that of the rod are different.

20 Claims, 4 Drawing Sheets

SHOCK ABSORBER

TECHNICAL FIELD

This invention relates to a shock absorber.

BACKGROUND ART

Figure 1:
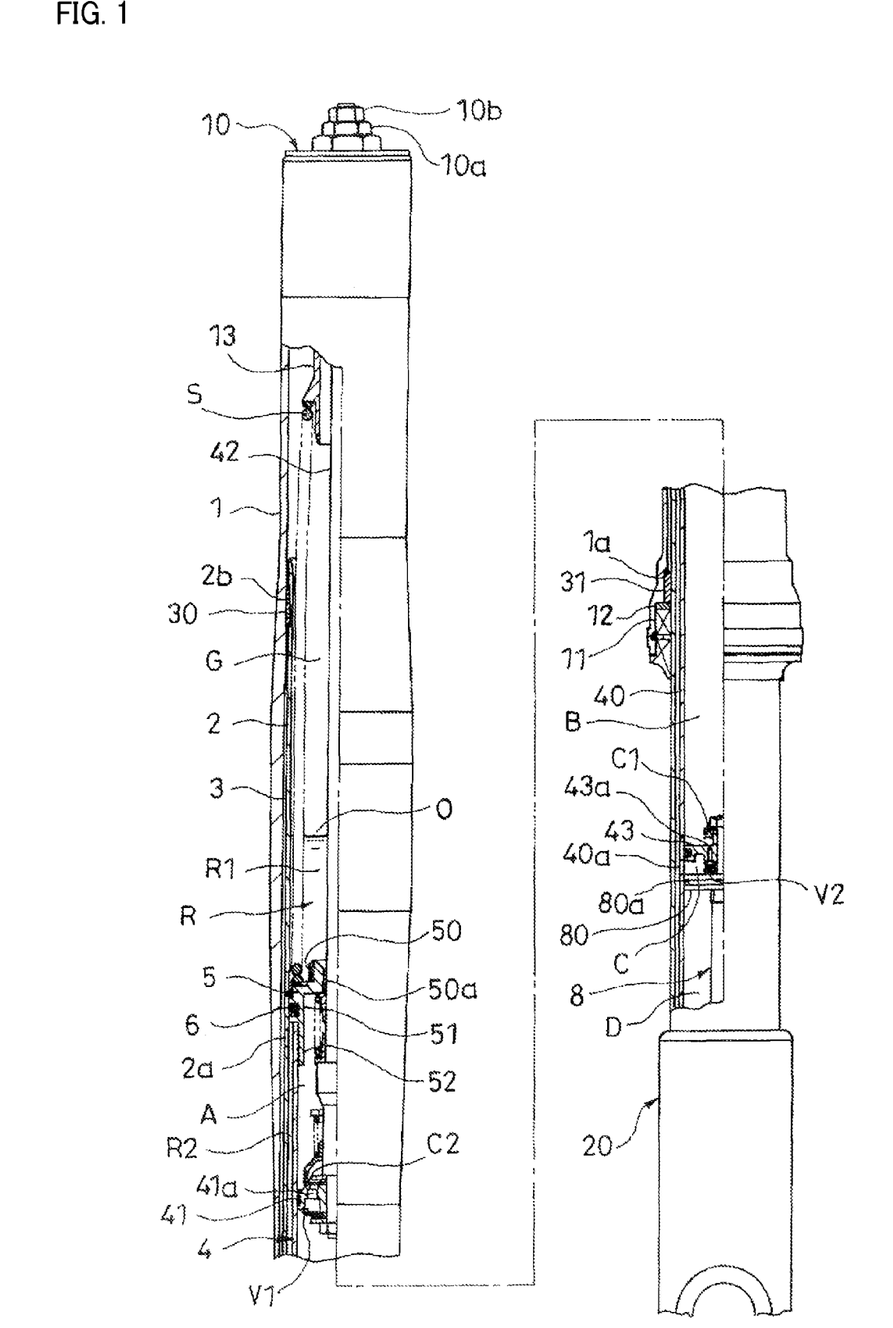
FIG. 1 is a front view, partly cut out, showing a front fork according to a first embodiment of the present invention.

JP1992-312221A discloses a shock absorber interposed between a vehicle body and a wheel to damp road vibration input to the wheel. This shock absorber is applied to a front fork for suspending a front wheel of a two-wheeled vehicle and includes a shock absorber main body composed of a vehicle-body side tube and a wheel side tube to be slidably inserted into the vehicle-body side tube via a pair of upper and lower bearings as shown in FIG. 1 of the above document.

The upper bearing is mounted on the outer periphery of the wheel side tube and the lower bearing is mounted on the inner periphery of the vehicle-body side tube, and a working fluid stored in a lubrication clearance formed between these bearings functions as a lubricant to provide good slidability.

An upright damper including a cylinder which stands in an axial center part of the wheel side tube and in which the working fluid is filled, a piston which is held in sliding contact with the inner periphery of the cylinder and partitions the interior of the cylinder into two working chambers, and a rod which intrudes into and exits from the cylinder via the piston is housed in the shock absorber main body. A reservoir chamber is formed between the shock absorber main body and the damper.

The reservoir chamber is composed of an air chamber and a working fluid chamber, and the working fluid that becomes excessive or insufficient in the cylinder by the amount of displacement of the rod is compensated via a base member provided at a bottom part of the cylinder, thereby carrying out a volume compensation for the damper.

The working fluid chamber of the reservoir chamber communicates with the lubrication clearance via a flow path, and a check valve for permitting only a movement of the working fluid from the working fluid chamber to the lubrication clearance is provided at an intermediate position of the flow path.

When the front fork is compressed, the working fluid that becomes excessive by the intruding amount of the rod flows out into the working fluid chamber via the base member to increase the volume of the lubrication clearance. This causes a pressure difference between the working fluid chamber and the lubrication clearance, whereby the check valve is opened and the working fluid flows into the lubrication clearance via the flow path.

On the other hand, when the front fork is extended, the lubrication clearance is compressed and the check valve is biased in a closing direction by an inner pressure of the lubrication clearance, wherefore communication of the flow path is blocked.

Accordingly, by the front fork being repeatedly extended and compressed, a so-called pumping action is performed, whereby the working fluid is pumped up into the lubrication clearance, a fluid level in the lubrication clearance becomes higher and the working fluid can be more easily supplied to a sliding surface of the upper bearing.

However, if the pressure difference between the working fluid chamber and the lubrication clearance is small, the check valve is not opened, wherefore the working fluid is not sufficiently supplied to the sliding surface of the upper bearing and lubrication may possibly become insufficient.

Accordingly, the following structure is disclosed in FIG. 3 of the above document. The working fluid chamber is partitioned into upper and lower sections by a rod guide, and a communication path allowing communication between the upper and lower working fluid chambers is formed in the rod guide. Further, a damping valve for giving resistance when the working fluid moves from a lower working chamber to an extension side working chamber along the communication path is provided, and the lower working fluid chamber communicates with the lubrication clearance via the check valve.

In this way, when the front fork is compressed, an inner pressure of the lower working fluid chamber is increased to cause a pressure difference, thereby enabling the working fluid to be more reliably supplied to the sliding surface of the upper bearing.

SUMMARY OF THE INVENTION

In the conventional front fork, the rod guide needs to be provided with the damping valve in addition to the check valve to reliably lubricate the sliding surface of the upper bearing, which leads to a complicated structure.

The present invention aims to provide a shock absorber capable of more reliably lubricating a sliding surface of an upper bearing without complicating a structure.

According to one aspect of the present invention, a shock absorber is provided which comprises a shock absorber main body composed of a vehicle-body side tube and a wheel side tube to be slidably inserted into the vehicle-body side tube via a pair of upper and lower bearings, the upper bearing being mounted on the outer periphery of the wheel side tube, the lower bearing being mounted on the inner periphery of the vehicle-body side tube and a lubrication clearance being formed between the pair of upper and lower bearings; a damper including a cylinder which stands in an axial center part of the wheel side tube and stores a working fluid, a piston which is held in sliding contact with the inner periphery of the cylinder and partitions the interior of the cylinder into two working chambers, and a rod which intrudes into and exits from the cylinder via the piston; a reservoir chamber formed between the shock absorber main body and the damper, composed of an air chamber and a working fluid chamber and configured to compensate for the working fluid that becomes excessive and insufficient in the damper; a partition wall member partitioning the working fluid chamber into an upper working fluid chamber and a lower working fluid chamber; a flow path formed in the partition wall member and having a check valve to permit only a movement of the working fluid from the upper working fluid chamber to the lower working fluid chamber; and a communication path allowing communication between the lower working fluid chamber and the lubrication clearance; wherein a cross-sectional area of the lubrication clearance and that of the rod are different.

Embodiments of the present invention and advantages thereof are described in detail below with reference to the accompanying drawings.

EMBODIMENTS OF THE INVENTION

In the following description, the same reference signs given in several drawings indicate the same components or corresponding components.

A first embodiment is described.

A shock absorber according to this embodiment is applied to a front fork interposed between a vehicle body and a front wheel of a two-wheeled vehicle and adapted to damp road vibration input to the front wheel.

As shown in FIG. 1, the front fork includes a shock absorber main body composed of a vehicle-body side tube 1 and a wheel side tube 2 to be slidably inserted into the vehicle-body side tube 1 via a pair of upper and lower bearings 30, 31. The upper bearing 30 is mounted on the outer periphery of the wheel side tube 2 and the lower bearing 31 is mounted on the inner periphery of the vehicle-body side tube 1, and a lubrication clearance 3 is formed between these bearings 30, 31.

The front fork includes a damper 4 including a cylinder 40, a piston 41 and a rod 42. The cylinder 40 stands in an axial center part of the wheel side tube 2 and stores a working fluid. The piston 41 is held in sliding contact with the inner periphery of the cylinder 40 and partitions the interior of the cylinder 40 into two working chambers A, B. The rod 42 intrudes into and exits from the cylinder 40 via the piston 41.

The front fork includes a reservoir chamber formed between the shock absorber main body and the damper 4. The reservoir chamber is composed of an air chamber G and a working fluid chamber R and compensates for the working fluid that becomes excessive and insufficient in the damper 4.

Figure 2:
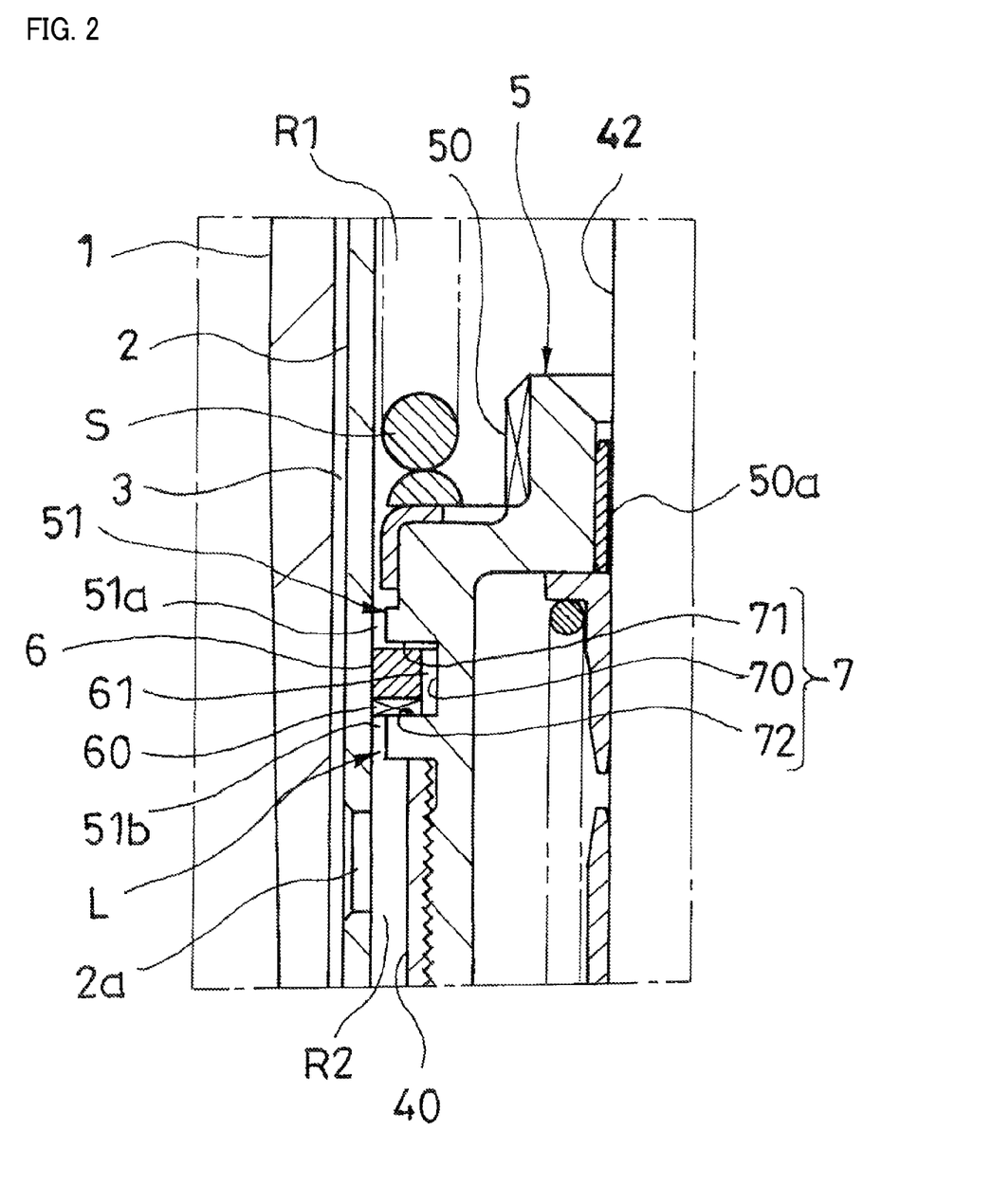
FIG. 2 is a vertical sectional view enlargedly showing a main part of the front fork according to the first embodiment of the present invention.
Figure 3:
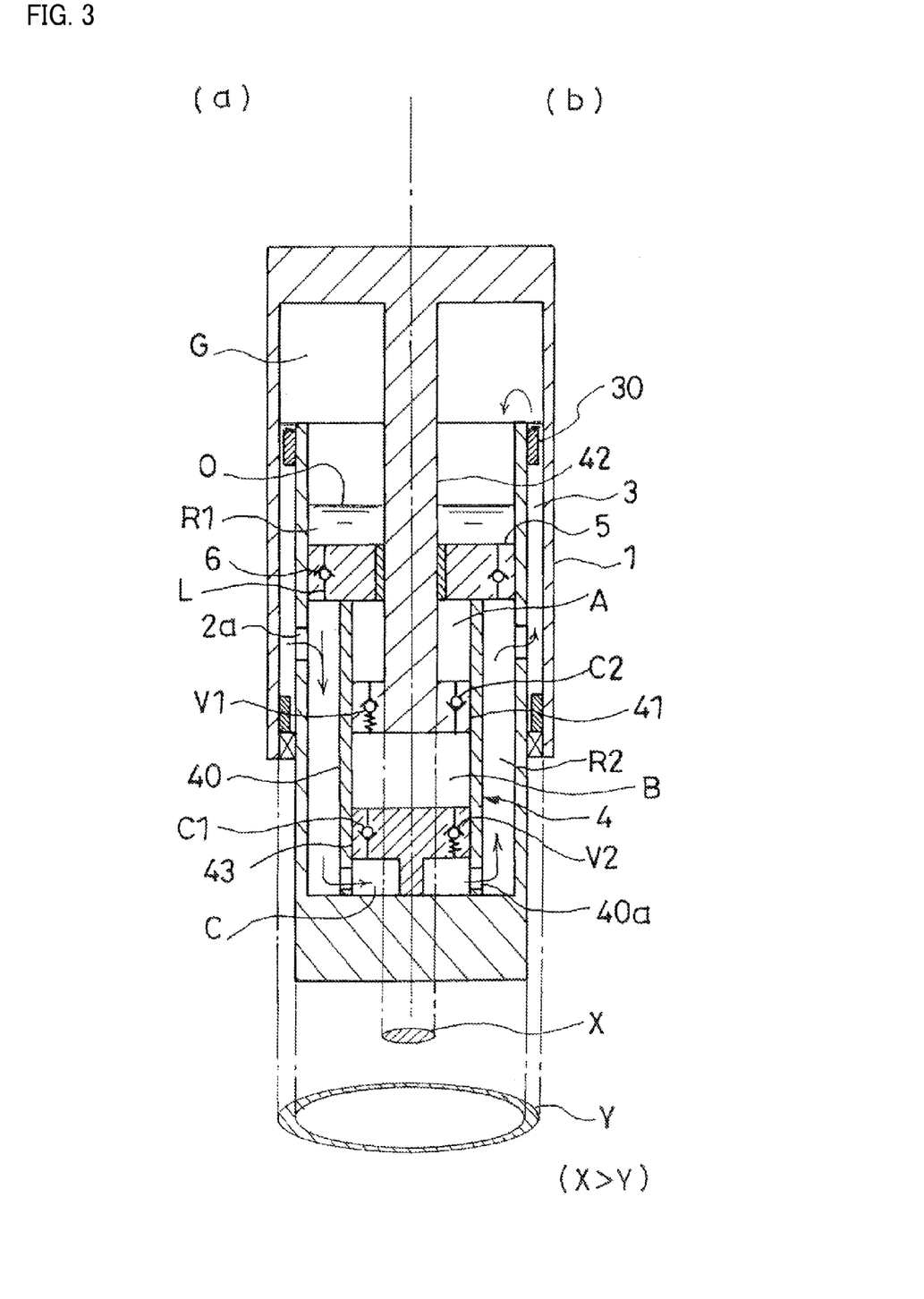
FIG. 3 is a principle diagram showing a vertical cross-section of the front fork according to the first embodiment of the present invention. Arrows on a left side (a) of a center line indicate a moving direction of a working fluid at the time of extension and arrows on a right side (b) of the center line indicate a moving direction of the working fluid at the time of compression.

The front fork includes a rod guide 5, a flow path L and a communication path 2a. The rod guide 5 is a partition wall member for partitioning the working fluid chamber R into upper and lower sections (R1, R2). The flow path L includes a check valve 6 which is formed in the rod guide 5 and permits only a movement of the working fluid from the upper working fluid chamber R1 to the lower working fluid chamber R2 (FIG. 2). The communication path 2a allows communication between the lower working fluid chamber R2 and the lubrication clearance 3. The lubrication clearance 3 is formed to have a smaller cross-sectional area Y than a cross-sectional area X of the rod 42 (FIG. 3).

More specifically, the front fork is an inverted front fork in which the wheel side tube 2 intrudes into and exits from the vehicle-body side tube 1.

The upper and lower openings of the shock absorber main body composed of the vehicle-body side tube 1 and the wheel side tube 2 are respectively sealed by a cap member 10 provided at a shown upper end part of the vehicle-body side tube 1 and a bottom member 20 threadably engaged with the outer periphery of the wheel side tube 2.

The opening of a tubular clearance including the lubrication clearance 3 formed between the vehicle-body side tube 1 and the wheel side tube 2 is sealed by a seal member 11 provided on the inner periphery of a lower end part of the vehicle-body side tube 1 and held in sliding contact with the outer periphery of the wheel side tube 2, so that the working fluid and air stored in the shock absorber main body do not leak to the outside.

The upper bearing 30 mounted on the outer periphery of the wheel side tube 2 is engaged with a groove 2b formed on the outer periphery of an upper end part of the wheel side tube 2 and held in sliding contact with the inner periphery of the vehicle-body side tube 1.

The lower bearing 31 mounted on the inner periphery of the vehicle-body side tube 1 is positioned between an annular metal member 12 provided right above the seal member 11 and a step portion 1a formed on the inner periphery of the vehicle-body side tube 1 and held in sliding contact with the outer periphery of the wheel side tube 2.

The tubular lubrication clearance 3 formed between the upper bearing 30 and the lower bearing 31 contracts due to the approaching of upper and lower bearings 30, 31 when the front fork is extended, and enlarges due to the separating of upper and lower bearings 30, 31 when the front fork is compressed.

The lubrication clearance 3 communicates with the lower working fluid chamber R2 via the communication path 2a perforated in the wheel side tube 2.

The damper 4 and a suspension spring S for generating a predetermined damping force are housed in the shock absorber main body located inside the vehicle-body side tube 1 and the wheel side tube 2. The suspension spring S absorbs an pushing up input from a road surface and the damper 4 damps extension and contraction movements of the front fork associated with this absorption.

The suspension spring S has a lower end supported on the rod guide 5 and an upper end part engaged with a tubular upper spring bearing 13 held in the cap member 10 and constantly biases the front fork in an extension direction.

By rotating an adjuster 10a attached to the cap member 10 to move the upper spring bearing 13 in a shown vertical direction, an initial load acting on the suspension spring S can be arbitrarily adjusted.

The damper 4 includes the cylinder 40, the annular rod guide 5, the piston 41, the rod 42 and a base member 43. The cylinder 40 stands in the axial center part of the wheel side tube 2. The annular rod guide 5 is mounted on a head part of the cylinder 40. The piston 41 is held in sliding contact with the inner periphery of the cylinder 40. The rod 42 intrudes into and exits from the cylinder 40 via the piston 41 while penetrating through the rod guide 5. The base member is provided at a bottom part of the cylinder 40.

The rod 42 has the upper end fixed to the cap member 10 and moves in an axial direction together with the piston 41 in the cylinder 40 according to the extension and contraction of the front fork. The rod 42 is formed to have the cross-sectional area X smaller than the cross-sectional area Y of the lubrication clearance 3 as shown in FIG. 3 which is a principle diagram.

As shown in FIG. 1, the rod guide 5 includes a guide portion 50, a large-diameter portion 51 and a coupling portion 52 and is arranged to be constantly located in the working fluid chamber R. The guide portion 50 includes, on the inner periphery, an annular bearing 50a for rotatably supporting the rod 42. The outer periphery of the large-diameter portion 51 is larger than that of the cylinder 40. The coupling portion 52 is threadably engaged with the inner periphery of the head part of the cylinder 40.

The base member 43 is held on an upper end part of a base rod 8 standing in an axial center part of the bottom part of the cylinder 40. The base rod 8 includes a jaw portion 80 formed below the base member 43 and held in close contact with the inner periphery of the cylinder 40 via a seal 80*a*, and a fluid chamber C is formed between the jaw portion 80 and the base member 43.

The cylinder 40 includes a passage hole 40*a* perforated between the base member 43 and the jaw portion 80. The fluid chamber C communicates with the lower working fluid chamber R2 via the passage hole 40*a*.

The interior of the cylinder 40 formed between the rod guide 5 and the base member 43 is partitioned into two working chambers A, B, i.e. an extension side working chamber A located at the rod 42 side and a compression side working chamber B located at the piston 41 side, by the piston 41.

That is, the extension side working chamber A formed between the rod guide 5 and the piston 41, the compression side working chamber B formed between the piston 41 and the base member 43 and the fluid chamber C formed between the base member 43 and the jaw portion 80 are formed inside the cylinder 40.

The extension side working chamber A communicates with the compression side working chamber B via an extension side flow path and a compression side flow path 41*a* formed in the piston 41. The compression side working chamber B communicates with the fluid chamber C via an extension side flow path and a compression side flow path 43*a* formed in the base member 43. The fluid chamber C communicates with the lower working fluid chamber R2 via the passage hole 40*a*.

The extension side flow path formed in the piston 41 is openably and closably closed by an extension side damping valve V1 laminated on the compression side working chamber B side of the piston 41. The compression side flow path 41*a* formed in the piston 41 is openably and closably closed by a compression side check valve C2 laminated on the extension side working chamber A side of the piston 41.

On the other hand, the extension side flow path formed in the base member 43 is openably and closably closed by an extension side check valve C1 laminated on the compression side working chamber B side of the base member 43. The compression side flow path 43*a* formed in the base member 43 is openably and closably closed by a compression side damping valve V2 laminated on the fluid chamber C side of the base member 43.

In this embodiment, the working fluid stored in the front fork can be reduced to make the front fork lighter by providing the jaw portion 80 on the base rod 8 and forming an air chamber D below the jaw portion 80. However, the air chamber D may not necessarily be provided.

A valve opening pressure of the compression side check valve C2 provided in the piston 41 can be adjusted by an adjuster 10*b* attached to the cap member 10.

The reservoir chamber formed between the damper 4 and the shock absorber main body is composed of the air chamber G formed above the fluid level O of the working fluid stored inside and the working fluid chamber R formed below the fluid level O. The working fluid chamber R is partitioned into upper and lower sections (R1, R2) by the large-diameter portion 51 of the rod guide 5.

As shown in FIG. 2, an annular groove 7 having a C-shaped cross-section is formed in a central part of the outer periphery of the large-diameter portion 51 and clearances 51*a*, 51*b* are respectively formed between upper and lower parts of the outer periphery of the large-diameter portion 51 and the wheel side tube 2.

The annular groove 7 has an annular check valve 6 loosely fitted in an outer peripheral thereof and is composed of a vertical surface 70 facing the inner periphery of the check valve 6 and upper and lower surfaces 71, 72 formed to face each other at the upper and lower ends of the vertical surface 70.

The check valve 6 is formed to have a shorter length in the axial direction than the vertical surface 70 and includes a cut 60 radially formed in the lower surface. Further, the outer periphery of the check valve 6 is held in sliding contact with the inner periphery of the wheel side tube 2 and a clearance flow path 61 is formed between the inner periphery of the check valve 6 and the vertical surface 70.

If the inner pressure of the upper working fluid chamber R1 is higher than that of the lower working fluid chamber R2, the check valve 6 comes into contact with the lower surface 72 of the annular groove 7 and the working fluid moves via the clearance 51*a*, a clearance formed between the upper surface of the check valve 6 and the upper surface 71 of the annular groove 7, the clearance flow path 61, the cut 60 and the clearance 51*b*.

That is, the flow path L is formed by the clearance 51*a*, the clearance formed between the upper surface of the check valve 6 and the upper surface 71 of the annular groove 7, the clearance flow path 61, the cut 60 and the clearance 51*b*.

On the other hand, if the inner pressure of the lower working fluid chamber R2 is higher than that of the upper working fluid chamber R1, the check valve 6 is seated on the upper surface 71 of the annular groove 7 and the clearance formed between the upper surface of the check valve 6 and the upper surface 71 of the annular groove 7 is eliminated to block the flow path L.

By having the above configuration, the check valve 6 can permit only a movement of the working fluid from the upper working fluid chamber R1 to the lower working fluid chamber R2. The configuration of the check valve 6 is not limited to the above and can be arbitrarily selected.

In this embodiment, the partition wall member for partitioning the working fluid chamber R into the upper and lower sections (R1, R2) is formed by the rod guide 5 including the large-diameter portion 51, and the flow path L is formed between the outer periphery of the large-diameter portion 51 and the wheel side tube 2, wherefore processing to form the flow path L is easy. The configuration of the flow path L is not limited to the above and can be arbitrarily selected.

For example, a partition wall portion may be formed by bringing the outer periphery of the large-diameter portion 51 of the rod guide 5 into close contact with the inner periphery of the wheel side tube, and a hole penetrating in the axial direction may be formed in the partition wall portion and may be caused to function as the flow path L.

Next, the operation of the front fork in this embodiment is described.

When the front fork is extended, the extension side working chamber A is pressurized and the working fluid in the extension side working chamber A opens the extension side damping valve V1 of the piston 41 and moves to the compression side working chamber B, whereby the working fluid that becomes insufficient by as much as the volume of the rod 42 that has exited opens the extension side check valve C1 of the base member 43 and moves from the lower working fluid chamber R2 to the compression side working chamber B to generate an extension side damping force.

As shown in FIG. 3, since the cross-sectional area Y of the lubrication clearance 3 is smaller than the cross-sectional area X of the rod 42, the volume of the contracted lubrication clearance 3 is smaller than the volume of the rod 42 that has exited. The working fluid corresponding to this difference becomes insufficient in the lower working fluid chamber R2 and the inner pressure of the upper working fluid chamber R1 becomes relatively higher than that of the lower working fluid chamber R2.

In this way, as shown on the left side (a) of FIG. 3, the check valve 6 of the rod guide 5 opens, and the insufficient working fluid is supplied from the upper working fluid chamber R1 to the lower working fluid chamber R2 via the flow path L.

On the other hand, when the front fork is compressed, the compression side working chamber B is pressurized and the working fluid in the compression side working chamber B opens the compression side check valve C2 of the piston 41 and moves to the extension side working chamber A, whereby the working fluid that becomes excessive by as much as the volume of the rod 42 that has intruded opens the compression side damping valve V2 of the base member 43 and moves from the compression side working chamber B to the lower working fluid chamber R2 to generate a compression side damping force.

As shown in FIG. 3, since the cross-sectional area Y of the lubrication clearance 3 is smaller than the cross-sectional area X of the rod 42, the volume of the rod 42 that has intruded is larger than the volume of the enlarged lubrication clearance 3. The working fluid corresponding to this difference becomes excessive in the lower working fluid chamber R2 and the inner pressure of the lower working fluid chamber R2 becomes higher than that of the upper working fluid chamber R1. In this case, the check valve 6 of the rod guide 5 is maintained in the closed state.

In this way, as shown on the right side (b) of FIG. 3, the excessive working fluid leaks out from the lubrication clearance 3 and moves to the upper working fluid chamber R1 by way of a space between the upper bearing 30 and the vehicle-body side tube 1, i.e. the sliding surface of the upper bearing 30.

Since the working fluid invariably passes the sliding surface of the upper baring 30 when the front fork is compressed as described above, the sliding surface of the upper bearing 30 can be reliably lubricated. Further, the structure is simpler than before and the complication of the front fork can be avoided.

Next, a second embodiment is described.

A shock absorber according to this embodiment is applied to a front fork as in the first embodiment. A basic configuration of the front fork is the same as in the first embodiment, but differs in that the cross-sectional area Y of the lubrication clearance 3 is larger than the cross-sectional area X of the rod 42 as shown in FIG. 4.

Reference is made to the first embodiment for the explanation of the detailed configuration of the front fork. The operation of the front fork and effects brought about by configuration differences in this embodiment are described below.

When the front fork is extended, the extension side working chamber A is pressurized and the working fluid in the extension side working chamber A opens the extension side damping valve V1 of the piston 41 and moves to the compression side working chamber B as in the first embodiment, whereby the working fluid that becomes insufficient by as much as the volume of the rod 42 that has exited opens the extension side check valve C1 of the base member 43 and moves from the lower working fluid chamber R2 to the compression side working chamber B to generate an extension side damping force.

Figure 4:
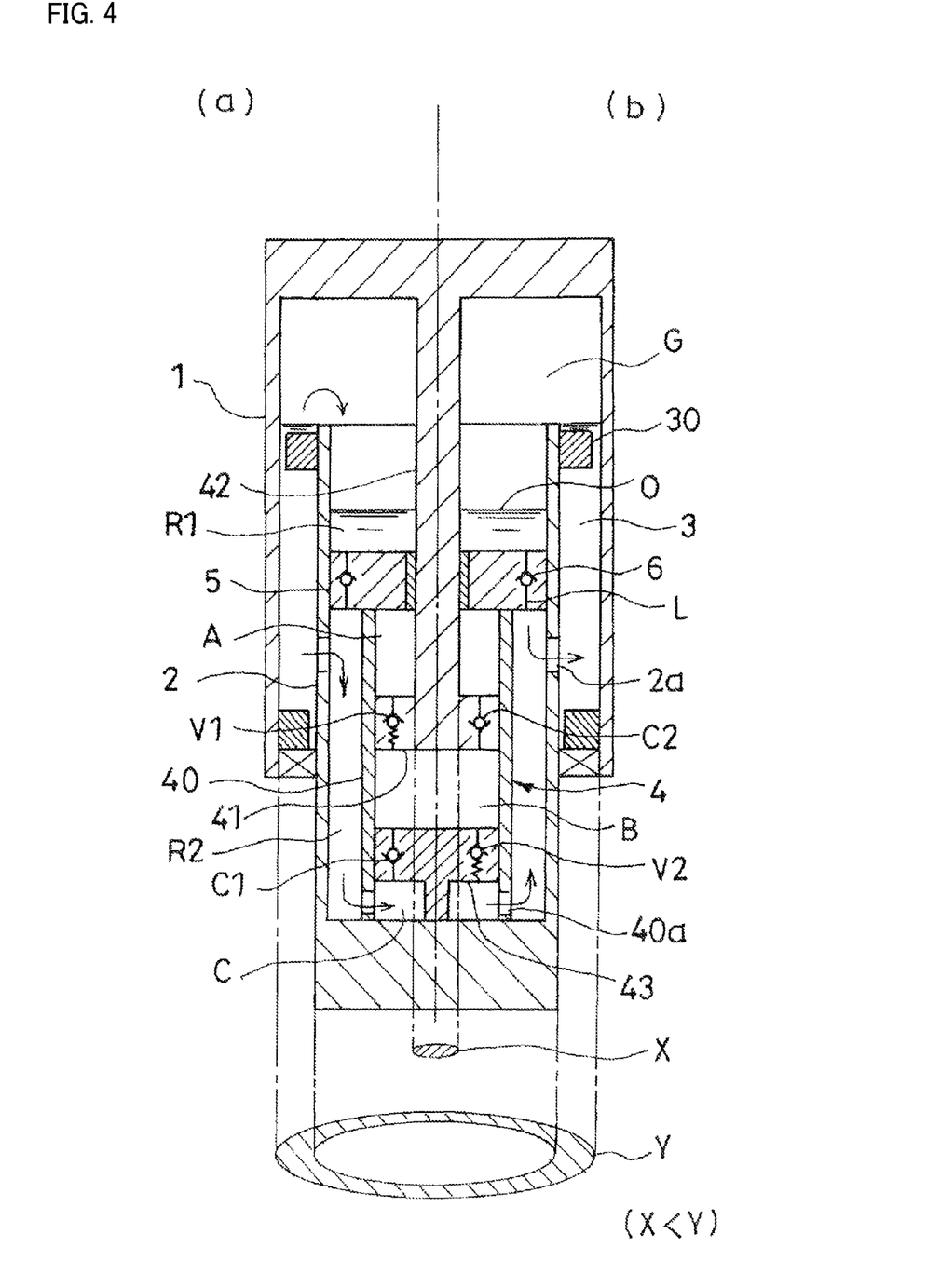
FIG. 4 is a principle diagram showing a vertical cross-section of a front fork according to a second embodiment of the present invention. Arrows on a left side (a) of a center line indicate a moving direction of a working fluid at the time of extension and arrows on a right side (b) of the center line indicate a moving direction of the working fluid at the time of compression.

As shown in FIG. 4, since the cross-sectional area Y of the lubrication clearance 3 is larger than the cross-sectional area X of the rod 42, the volume of the contracted lubrication clearance 3 is larger than the volume of the rod 42 that has exited. The working fluid corresponding to this difference becomes excessive in the lower working fluid chamber R2 and the inner pressure of the lower working fluid chamber R2 becomes higher than that of the upper working fluid chamber R1. Thus, the check valve 6 of the rod guide 5 is maintained in the closed state.

In this way, as shown on the left side (a) of FIG. 4, the excessive working fluid leaks out from the lubrication clearance 3 and moves to the upper working fluid chamber R1 by way of the space between the upper bearing 30 and the vehicle-body side tube 1, i.e. the sliding surface of the upper bearing 30.

On the other hand, when the front fork is compressed, the compression side working chamber B is pressurized and the working fluid in the compression side working chamber B opens the compression side check valve C2 of the piston 41 and moves to the extension side working chamber A as in the first embodiment, whereby the working fluid that becomes excessive by as much as the volume of the rod 42 that has intruded opens the compression side damping valve V2 of the base member 43 and moves from the compression side working chamber B to the lower working fluid chamber R2 to generate a compression side damping force.

Since the cross-sectional area Y of the lubrication clearance 3 is larger than the cross-sectional area X of the rod 42, the volume of the rod 42 that has intruded is smaller than the volume of the enlarged lubrication clearance 3. The working fluid corresponding to this difference becomes insufficient in the lower working fluid chamber R2 and the inner pressure of the upper working fluid chamber R1 becomes relatively higher than that of the lower working fluid chamber R2.

In this way, as shown on the right side (b) of FIG. 4, the check valve 6 of the rod guide 5 opens, wherefore the insufficient working fluid is supplied from the upper working fluid chamber R1 to the lower working fluid chamber R2 via the flow path L.

Since the working fluid invariably passes the sliding surface of the upper baring 30 when the front fork is extended as described above, the sliding surface of the upper bearing 30 can be reliably lubricated. Further, the structure is simpler than before and the complication of the front fork can be avoided.

Since resistance is produced when the working fluid in the lubrication clearance 3 passes between the upper bearing 30 and the vehicle-body side tube 1 at the time of extending the front fork in this embodiment, an extension side damping force can be generated. Thus, the damping force generated at the time of extending the front fork can be increased and ride quality can be improved as compared with the first embodiment in which the damping force increases at the time of compressing the front fork.

The embodiments of the present invention described above are merely illustration of some application examples of the present invention and not of the nature to limit the technical scope of the present invention to the specific constructions of the above embodiments.

For example, the case where the shock absorber is applied to the front fork has been described as an example in the above embodiment. However, there is no limitation to this and the shock absorber may be applied to another unit such as rear cushion unit.

The present application claims a priority based on Japanese Patent Application No. 2010-269521 filed with the Japan Patent Office on Dec. 2, 2010, all the contents of which are hereby incorporated by reference.

The invention claimed is:

1. A shock absorber, comprising:
a shock absorber main body composed of a vehicle-body side tube and a wheel side tube to be slidably inserted into the vehicle-body side tube via a pair of upper and lower bearings, the upper bearing being mounted on the outer periphery of the wheel side tube, the lower bearing being mounted on the inner periphery of the vehicle-body side tube and a lubrication clearance being formed between the pair of upper and lower bearings;
a damper including a cylinder which stands in an axial center part of the wheel side tube and stores a working fluid, a piston which is held in sliding contact with the inner periphery of the cylinder and partitions the interior of the cylinder into two working chambers, and a rod which intrudes into and exits from the cylinder via the piston;
a reservoir chamber formed between the shock absorber main body and the damper, composed of an air chamber and a working fluid chamber and configured to compensate for the working fluid that becomes excessive and insufficient in the damper;
a partition wall member partitioning the working fluid chamber into an upper working fluid chamber and a lower working fluid chamber;
a flow path formed in the partition wall member and having a check valve to permit only a movement of the working fluid from the upper working fluid chamber to the lower working fluid chamber; and
a communication path allowing communication between the lower working fluid chamber and the lubrication clearance; wherein
a cross-sectional area of the lubrication clearance and that of the rod are different.

2. The shock absorber according to claim 1, wherein the cross-sectional area of the lubrication clearance is smaller than that of the rod.

3. The shock absorber according to claim 1, wherein the cross-sectional area of the lubrication clearance is larger than that of the rod.

4. The shock absorber according to claim 1, further comprising a base member provided at a bottom part of the cylinder, wherein:
the two working chambers partitioned by the piston are an extension side working chamber formed at the rod side and a compression side working chamber formed at the piston side; and
the compression side working chamber and the lower working fluid chamber communicate via the base member provided at the bottom part of the cylinder.

5. The shock absorber according to claim 1, wherein the partition wall member is an annular rod guide mounted on a head part of the cylinder.

6. The shock absorber according to claim 5, wherein the rod guide includes a large-diameter portion, the outer periphery of which is formed to have a larger diameter than that of the cylinder, and the flow path is formed between the outer periphery of the large-diameter portion and the wheel side tube.

7. The shock absorber according to claim 6, wherein:
an annular groove having a C-shaped cross section is formed in the outer periphery of the large-diameter portion and an annular check valve is loosely fitted in an outer peripheral of the annular groove;
the annular groove is formed by a vertical surface facing the inner periphery of the annular check valve and an upper surface and a lower surface formed to face each other at the upper and lower ends of the vertical surface; and
the annular check valve is formed to have an axial length shorter than a length of the vertical surface, the outer periphery of the annular check valve is held in sliding contact with the inner periphery of the wheel side tube, a radially formed cut is provided in the lower surface of the annular check valve, and a clearance flow path is formed between the inner periphery of the annular check valve and the vertical surface.

8. The shock absorber according to claim 6, wherein:
an annular groove having a C-shaped cross section is formed in the outer periphery of the large-diameter portion, and the check valve is an annular check valve and is loosely fitted in an outer peripheral part of the annular groove;
the annular groove is formed by a vertical surface facing an inner periphery of the check valve and an upper surface and a lower surface formed to face each other at upper and lower ends of the vertical surface;
the check valve is formed to have an axial length shorter than a length of the vertical surface, an outer periphery of the check valve is held in sliding contact with an inner periphery of the wheel side tube, a radially formed cut is provided in a lower surface of the check valve, and
a clearance flow path is formed between the inner periphery of the check valve and the vertical surface.

9. The shock absorber according to claim 1, wherein the lubrication clearance has an upper end at the upper bearing,
further wherein the working fluid is in the lubrication clearance, and the working fluid in the lubrication clearance directly contacts the upper bearing based upon a difference between a pressure of the upper working fluid chamber and a pressure of the lower working fluid chamber.

10. The shock absorber according to claim 9, wherein the working fluid in the lubrication clearance passes by the upper bearing and into the air chamber based upon the difference.

11. The shock absorber according to claim 9, wherein the working fluid in the lubrication clearance passes by the upper bearing, into the air chamber and then into the upper working fluid chamber based upon the difference.

12. The shock absorber according to claim 9, wherein the working fluid in the lubrication clearance passes by the upper bearing, and then into the upper working fluid chamber based upon the difference.

13. A shock absorber, comprising:
a shock absorber main body including
a vehicle-body side tube, and
a pair of upper and lower bearings, the lower bearing being mounted on an inner periphery of the vehicle-body side tube,
a wheel side tube slidably inserted into the vehicle-body side tube via the pair of upper and lower bearings, the upper bearing being mounted on an outer periphery of the wheel side tube,
a lubrication clearance being formed between the pair of upper and lower bearings;
a damper including
a cylinder which stands in an axial center part of the wheel side tube and stores a working fluid,
a piston slidable along an inner periphery of the cylinder, the piston partitioning an interior of the cylinder into two working chambers, and a rod which intrudes into and exits from the cylinder via the piston;

a reservoir chamber formed between the shock absorber main body and the damper, the reservoir chamber being composed of an air chamber and a working fluid chamber and configured to compensate for the working fluid when the working fluid becomes excessive and insufficient in the damper;

a partition wall member partitioning the working fluid chamber into an upper working fluid chamber and a lower working fluid chamber;

a flow path formed in the partition wall member and allowing for communication between the upper working fluid chamber and the lower working fluid chamber;

a check valve in the flow path to permit only a movement of the working fluid from the upper working fluid chamber to the lower working fluid chamber; and a communication path allowing communication between the lower working fluid chamber and the lubrication clearance, wherein a cross-sectional area of the lubrication clearance and that of the rod are different.

14. The shock absorber according to claim 13, wherein the lubrication clearance has an upper end at the upper bearing, further wherein the working fluid is in the lubrication clearance, and the working fluid in the lubrication clearance directly contacts the upper bearing based upon a difference between a pressure of the upper working fluid chamber and a pressure of the lower working fluid chamber.

15. The shock absorber according to claim 14, wherein the working fluid in the lubrication clearance passes by the upper bearing and into the air chamber based upon the difference.

16. The shock absorber according to claim 14, wherein the working fluid in the lubrication clearance passes by the upper bearing, into the air chamber and then into the upper working fluid chamber based upon the difference.

17. The shock absorber according to claim 14, wherein the working fluid in the lubrication clearance passes by the upper bearing, and then into the upper working fluid chamber based upon the difference.

18. The shock absorber according to claim 13, wherein the partition wall member is an annular rod guide mounted on a head part of the cylinder.

19. The shock absorber according to claim 18, wherein the rod guide includes a large-diameter portion, the outer periphery of which is formed to have a larger diameter than that of the cylinder, and the flow path is formed between the outer periphery of the large-diameter portion and the wheel side tube.

20. The shock absorber according to claim 19, wherein:

an annular groove having a C-shaped cross section is formed in the outer periphery of the large-diameter portion, and the check valve is an annular check valve and is loosely fitted in an outer peripheral of the annular groove;

the annular groove is formed by a vertical surface facing an inner periphery of the check valve and an upper surface and a lower surface formed to face each other at upper and lower ends of the vertical surface;

the check valve is formed to have an axial length shorter than a length of the vertical surface, an outer periphery of the check valve is held in sliding contact with an inner periphery of the wheel side tube, a radially formed cut is provided in a lower surface of the check valve, and a clearance flow path is formed between the inner periphery of the check valve and the vertical surface.

* * * * *